United States Patent [19]
Gold et al.

[11] Patent Number: 5,924,047
[45] Date of Patent: Jul. 13, 1999

[54] METHOD AND APPARATUS FOR NEUTRALIZING AND DESTROYING PENTABORANE

[75] Inventors: Jeffrey William Gold; Kenneth Joel Feinberg; Daniel James Buddin, all of Atlanta, Ga.

[73] Assignee: Integrated Environmental Services, Inc., Atlanta, Ga.

[21] Appl. No.: 08/827,547

[22] Filed: Mar. 28, 1997

[51] Int. Cl.$^6$ ............................. A62D 3/00; C06B 45/08; C01B 35/10; C01B 3/02

[52] U.S. Cl. ........................... 588/202; 588/203; 149/22; 149/121; 423/283; 423/648.1

[58] Field of Search ............................. 149/22, 121, 120; 588/202, 203; 423/278, 283, 658.2, 276, 645, 648.1

[56] References Cited

U.S. PATENT DOCUMENTS

| | | | |
|---|---|---|---|
| 4,644,877 | 2/1987 | Barton et al. | 110/250 |
| 5,545,800 | 8/1996 | Upadhye et al. | 588/231 |

OTHER PUBLICATIONS

Hodgman, Charles, Handbook of Chemistry and Physics, pp. 546–547, 1961.

*Primary Examiner*—Wayne Langel
*Assistant Examiner*—Melanie Wong
*Attorney, Agent, or Firm*—Jones & Askew, LLP

[57] ABSTRACT

A method and apparatus for neutralizing pentaborane. A high-capacity pentaborane processing system is disclosed that may be employed at a variety of sites where pentaborane may be stored. Remote monitoring and worker interface with the pentaboraneis limited to placement of a target cylinder into an airtight chamber and connection of process piping to each cylinder valve. Hydrolysis of the pentaborane is achieved in the system by rapid and extensive physical mixing of the pentaborane with water, which yields gaseous elemental hydrogen and residual boric acid. Sodium hydroxide may be provided to neutralize boric acid and form borax, which may be later precipitated out of the waste stream. Continuous monitoring through various pH and ORP sensors give operators information needed to maintain correct chemical balance throughout the reaction process. A cylinder or other container filled with pentaborane may be connected to an airtight system. A padding element may be used to extract the pentaborane from the container and deliver it to a metering pump or valve. The pump then delivers the pentaborane to an injection point where the pentaborane is introduced to a reagent, which may be water or some other suitable reagent. A reaction ensues, whereby the elemental hydrogen is isolated from the pentaborane. The elemental hydrogen is vented and oxidized. Residual boron is maintained in solution as boric acid and can be processed into borax. A secondary alcoholytic reaction may be utilized to further destroy any gas-phase pentaborane.

11 Claims, 1 Drawing Sheet

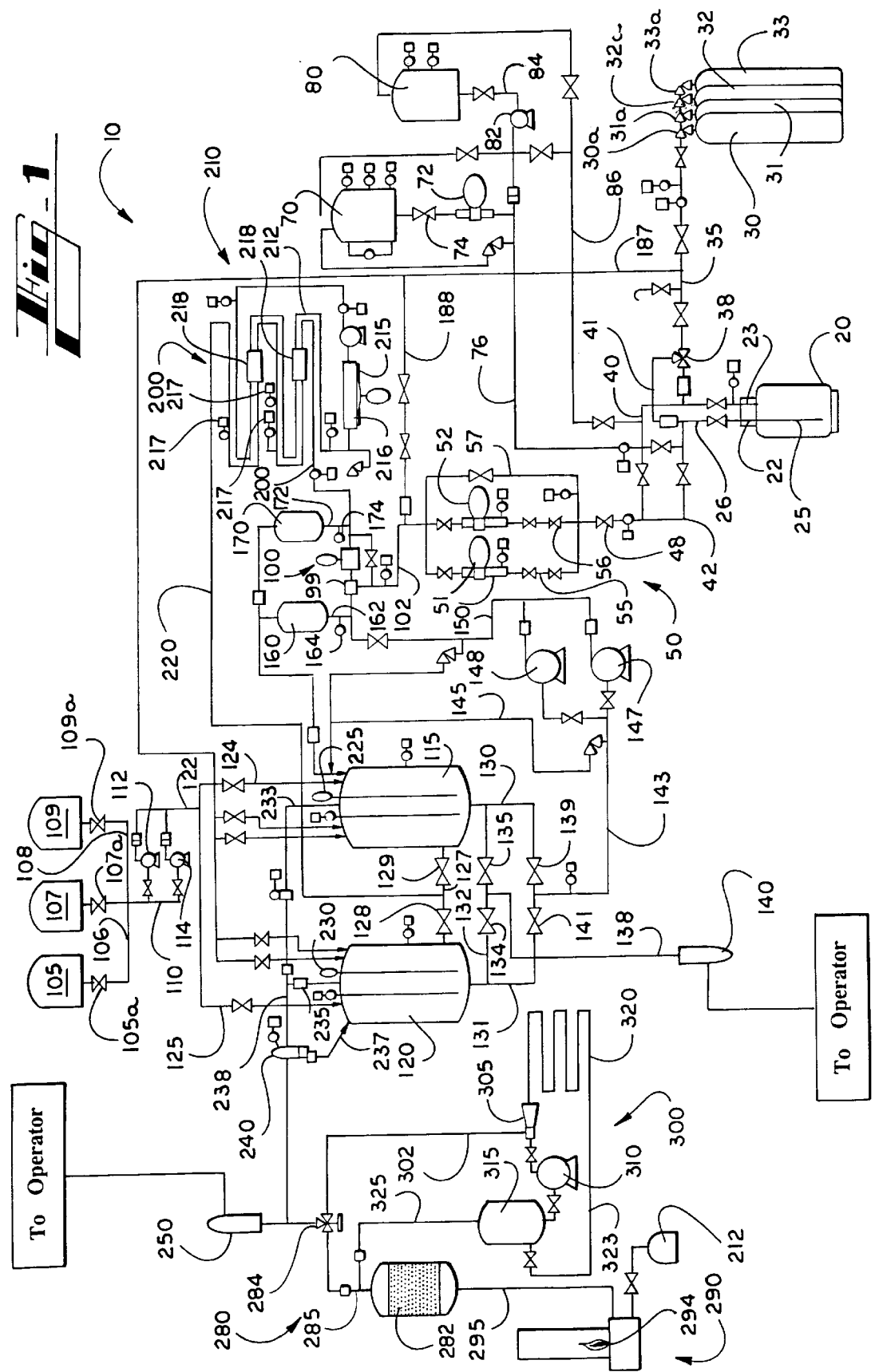

METHOD AND APPARATUS FOR NEUTRALIZING AND DESTROYING PENTABORANE

TECHNICAL FIELD

The present invention generally relates to the management and disposal of hazardous materials. More particularly, the present invention relates to a method and apparatus for high-capacity treatment of stocks of pentaborane using hydrolysis and, when appropriate alcoholysis.

BACKGROUND OF THE INVENTION

Pentaborane, a boron hydride, is a propellant that has been used as a rocket fuel additive for air-breathing engines. Accordingly, pentaborane has found utility in rockets, missiles and military jet aircraft. Because of its extremely toxic and pyrophoric nature, it is widely recognized that pentaborane must be handled with extreme caution.

Pentaborane, which may be represented by the chemical formulation "$B_5H_9$" (or "$B_5H_{11}$" in its unstable state), is an extremely dangerous material. It is typically a colorless liquid or gas that is highly toxic to humans by ingestion, skin contact or inhalation. For example, ingestion or inhalation of even a very small amount of pentaborane, on the order of five parts per million (5 ppm), is likely fatal and at least sufficient to cause severe distress to humans. The toxicity of pentaborane is comparable to that of chemical warfare nerve agents. Moreover, pentaborane is highly pyrophoric in air. Accordingly, there is not only a danger to anyone that must handle pentaborane, there is also an extreme danger of fire or explosion in handling pentaborane. Pentaborane is understandably listed as an "extremely hazardous substance" under Section 302 of the Superfund Amendments and Reauthorization Act ("SARA").

Yet further, while pentaborane is traditionally provided in a liquid state, liquid pentaborane evaporates rapidly and becomes gaseous at ambient, room temperature. Pentaborane is therefore oftentimes stored in cylinders or containers that secure the material and prevent its introduction to air. The cylinders are oftentimes stored in relatively cool environments such as underground facilities or bunkers. The containers are oftentimes of significant size. For example, it is not unusual to store pure pentaborane in a three hundred pound (300 lb.) container. With the pentaborane stored therein, the container and material may weigh as much as eight-hundred pounds (800 lbs.).

Pentaborane containers may sometimes be stored for significant periods of time, perhaps resulting in deterioration of the cylinder. In such an event, the cylinder must be emptied and purged of the pentaborane. Moreover, it has become desirable to dispose of certain quantities of pentaborane. Once again, in order to effect such disposal, the cylinders must be emptied and purged of the pentaborane. Given that pentaborane is colorless, flammable and extremely toxic even in very small amounts, such disposal is difficult.

A variety of attempts have been made in the past to dispose of pure pentaborane stocks. Due to the extremely difficult nature of handling the material, it has sometimes been found necessary to detonate a cylinder containing pentaborane rather than attempt to vent the pentaborane and treat it chemically. An example of one such effort that resulted from a failed cylinder is described in detail in a document entitled "Pentaborane Release Environmental Laboratories Hanover County Va, National Response Team Briefing, March 1982." This reference describes the difficulty experienced with a failed cylinder and the need to destroy the container. Other articles have been written detailing the dangerous nature of pentaborane and handling this material. See, for example, Silverman, J. J., et al., Post Traumatic Stress Disorder From Pentaborane Intoxication, JAMA 254 (18), 2603–2608 (1985).

Yet another article resulting from the Hanover County Pentaborane Release was published in "Fire Engineering" authored by the Hanover County, Virginia Fire Department Chief. This article detailed the dangerous nature of both the pentaborane and the destruction of the cylinder. As described therein, one major concern of the workers charged with the responsibility of disposing of the cylinder was the need to transport the failed cylinder from the location of the accident to another location where the cylinder could be destroyed. Of course, such transportation involves inherent risks to the general public as well as those directly involved in transporting the cylinder. The movement of such a hazardous material understandably involves and concerns a variety of state and federal environmental regulatory persons, depending on the particular circumstances. Even if the pentaborane container is in good condition, the catastrophic consequences of an in-transit accident render shipment of the cylinder difficult, costly and effectively unfeasible.

Thus, as shown by circumstances and instances of human exposure to pentaborane, there exists a need in the art to provide a systematic method and apparatus by which to dispose of pentaborane in a safe and efficient manner. Further, it would be preferable that any such method and apparatus be capable of handling and treating the pentaborane cylinder or other container on site, at the location where the cylinder or container is found. Moreover, because pentaborane is so toxic to humans, the preferred method and apparatus could be operated remotely without an operator being proximate to the cylinder or container. Such a remotely operated method and apparatus would preferably permit the operator to sense or detect the presence of any pentaborane, analyze the contents of the cylinder and any part of the apparatus for pentaborane and its treatment, and monitor the apparatus from a safe distance.

SUMMARY OF THE INVENTION

The present invention fills the above-described need in the prior art by providing a method and apparatus for neutralizing and destroying or disposing of pentaborane in a safe and efficient manner. The apparatus of the present invention is transportable from one location to another such that a pentaborane cylinder or container, failed or not, may be processed and the pentaborane treated on site. Yet further, the present invention is operable from a remote location so as to protect the operator and any other persons necessary to the handling and treatment processes. In fact, worker interface with a pentaborane cylinder is minimized to placement of the cylinder into an airtight chamber and connection of the cylinder to the apparatus of the invention.

Generally described, the present invention comprises a method and apparatus for removing the elemental hydrogen from a stock of pentaborane, oxidizing the hydrogen, and removing the residual boron as boric acid or treating the residual boron with inorganic hydroxides that are precipitated out of solution as non-toxic materials. Thus, it is to be understood that the present invention is intended to safely detoxify liquid and gas phase pentaborane through hydrolytic and alcoholytic processes.

Described more particularly, the method of the present invention includes extracting pentaborane from a container to be purged, mixing the pentaborane with a hydrolysis reagent so as to produce hydrogen gas, venting the hydrogen gas to a flare, oxidizing the hydrogen gas, and removing or treating the residual boron. The present invention may include various other steps such as measuring the temperature at various points in the apparatus (or at various points during practice of the method) and reagent composition levels as it circulates within the system. The method of the present invention may further include a relatively small gas-phase reaction process depending on the amount of pentaborane present, if any, in the evolved gases leaving the reagent vessels for oxidation.

Also described somewhat more particularly, the apparatus of the present invention includes means for extracting a quantity of pentaborane to be neutralized and destroyed from a container, an emulsifier for mixing the pentaborane with a hydrolysis reagent so as to induce the hydrolysis reaction, directing the reagent and pentaborane through a tortuous path wherein the reaction results in the creation of hydrogen gas and dissolved boron, means for oxidizing the hydrogen gas and means for removing or treating the residual dissolved boron. The apparatus of the present invention may further include sampling devices such as temperature sensors, pressure sensors or oxidation reduction potential (ORP) sensors for measuring the quantity of pentaborane present, if any, in the collected hydrogen gas contained in the reagent vessels and the various other operations of the system. The apparatus of the present invention may further include a scrubber that, prior to oxidation of the hydrogen gas, removes any unwanted or undesirable substance from the hydrogen gas. Yet further, the apparatus of the present invention may include a liquid-phase alcoholytic reaction process in the event of residual pentaborane. Such a system of alcoholysis is similar to the primary method (hydrolysis) and apparatus. This reaction process, if utilized, operates to isolate and remove residual pentaborane found in the gases being vented for oxidation.

Thus, it is an object of the present invention to provide a method and apparatus for neutralizing and destroying a container of pentaborane.

It is a further object of the present invention to provide a method and apparatus for remotely neutralizing and destroying a container of pentaborane.

It is a further object of the present invention to provide a method and apparatus for neutralizing and destroying pentaborane that is safe and efficient.

It is a further object of the present invention to provide a method and apparatus for neutralizing and destroying pentaborane that can be transported to a job site so as to minimize or eliminate the need to transport the pentaborane container to another location for treatment.

It is a further object of the present invention to provide a method and apparatus for neutralizing and destroying pentaborane in a environmentally friendly and safe manner.

It is a still further object of the present invention to provide a method and apparatus for neutralizing and destroying pentaborane that provides for the elemental hydrogen to be oxidized and residual boron to be removed or treated in a conventional manner.

These and yet other objects, features and advantages of the present invention will become apparent from reading the following specification, taken in conjunction with the accompanying drawing.

BRIEF DESCRIPTION OF THE DRAWING

FIG. 1 is a schematic representation of a preferred embodiment of the present invention.

DETAILED DESCRIPTION OF THE PREFERRED EMBODIMENTS

Referring now in more detail to the drawing, in which like numerals indicate like parts throughout any additional views, FIG. 1 shows an apparatus 10 constructed in accordance with the present invention.

Referring thereto, FIG. 1 shows a cylinder 20 containing pentaborane to be purged. As is known to those of ordinary skill in the art, the cylinder 20 provides an access opening 22 that is traditionally maintained by a liquid phase valve (not shown). As is further known to those of ordinary skill in the art, the cylinder 20 also provides vapor phase valve opening 23. The cylinder also provides a dip tube 25 in conjunction with the liquid phase valve opening 22. The cylinder valve openings 22 and 23 are of sufficient size to receive a section of process piping. For example, opening 22 receives a section of process piping 26 that communicates with the dip tube 25 that extends substantially near the base of the cylinder 20. It is to be appreciated that an airtight seal must be maintained at the location of the openings 22 and 23 to insure that the pentaborane contained in the cylinder 20 is not introduced to the air. In this regard, it is anticipated that an operator of this apparatus will place the cylinder 20 into an airtight chamber and connect process piping 26 to cylinder valve opening 22. It is likewise contemplated that an operator will connect a process piping 40 to cylinder valve opening 23, as described in greater detail below.

A supply of nitrogen, a padding agent, is provided in tanks 30, 31, 32 and 33. The nitrogen is typically stored under pressure in such tanks 30–33 and thus, by opening of one of the respective valves 30a, 31a, 32a or 33a, nitrogen is expelled from one of said tanks. In such an event, nitrogen may be supplied from tank 30 to a supply line 35, to a valve 38 and into process piping 40. By virtue thereof, nitrogen may be introduced to the cylinder 20. It is to be understood that such introduction of nitrogen to the cylinder 20 causes the pentaborane contained therein to be forced into the dip tube 25 and farther into that section of process piping 26 secured on this cylinder opening 22 as shown in FIG. 1. It is to be further understood that the entire system can be purged of air by circulating nitrogen from tanks 30–33 therethrough. The details of such an operation are known in the art and need not be disclosed in further detail herein.

It will be appreciated by those of ordinary skill in the art that a section of process piping section 41 also communicates with nitrogen supply line 35 as shown in the drawing. Further thereto, it will be appreciated that by manipulating valve 38 to direct the flow of nitrogen into line 41, and further into process piping section 26, nitrogen may be introduced to the cylinder 20 through piping section 26 and the dip tube 25.

As shown, another section of process piping, 42, communicates with process piping section 26. Both piping sections 40 and 42 lead to a metering pump assembly 50 including two metering pumps 51 and 52. Those of ordinary skill in the art will appreciate that these pumps 51 and 52 could also be metering or ball valves. Metering pump 51 communicates with either piping sections 40 or 42 through piping section 55. Metering pump 52 communicates with either piping sections 40 or 42 through piping section 56. A bypass line 57 is also provided. The metering pumps 51 and 52 are provided to receive pentaborane being forced out of cylinder 20 and pump a predetermined amount to an emulsifier 100 described in greater detail below. It is to be understood that only one metering pump, 51 or 52, is necessary at one time. Thus, a second pump is provided for redundancy reasons, but may not be necessary to the operation of the apparatus at a given point in time.

The apparatus 10 further includes two tanks 70 and 80. Tank 70 communicates with a metering pump 72 by means of process piping 74. Tank 80 communicates with a pump 82 by means of process piping 84. The tanks 70 and 80 may contain either kerosene or alcohol or a mixture thereof. By operation of metering pump 72, a predetermined quantity of kerosene or alcohol may be delivered to process piping 42 through piping section 76. Kerosene or alcohol may likewise be delivered to section 40 from tank 80 through piping section 86 by operation of pump 82. As described above, both sections 40 and 42 communicate with the cylinder 20. As described in greater detail below, the cylinder 20 may be rinsed with a kerosene/alcohol mixture as the process nears conclusion. Metering pumps 51 or 52 supply pentaborane to the emulsifier 100 by a feed line 102. The emulsifier 100 serves to hydrolize and violently mix a hydrolysis reagent and the pentaborane being forced out of cylinder 20. This process may preferably be accomplished as described herein.

The apparatus 10 includes three tanks 105, 107 and 109. Tank 105 contains water. Tank 107 contains alcohol. Tank 109 contains a caustic, such as sodium hydroxide. By means of process piping sections 106, 108 and 110, and respective valves 105a, 107a and 109a, and further by means of two pumps 112 and 114, the tanks 105, 107 and 109 are in fluid communication with two reagent vessels 115 and 120. It is to be understood that while the two vessels 115 and 120 are essentially identical, vessel 115 serves as the primary reagent vessel. More specifically, a section of process piping section 122 communicates with process piping section 124, which in turn deposit fluids from tanks 105, 107 or 109 into vessel 115. Alternatively, process piping section 122 communicates with piping section 125 which, in turn, may deposit fluids from said tanks into vessel 120. The reagent vessels 115 and 120 are in direct communication one with the other by means of piping section 127. Line 127 includes two valves 128 and 129 that control recirculation of the fluid into one of the reagent vessels 115 or 120 as described below.

Each vessel 115 and 120 is provided with exit lines 130 and 131, respectively. Lines 130 and 131 communicate with a recirculation line, 132, fitted with a valve 134 and another valve 135. By manipulation of the valves 134 or 135, fluid in either reagent vessel 115 or 120 may be drawn to process piping section 138, recirculated by opeartion of pump 147 or 148, and analyzed at station 140. It is to be understood that the sampling station 140 may include electronic transmission devices to alert a remote operator of the results of any analysis. The details of such remote sampling devices and techniques are known in the art and need not be described further herein. Exit line 130 is in communication with valve 139. Exit line 131 is in communication with valve 141. Fluid in either line 130 or 131 may thus be delivered to process piping section 143 for eventual delivery to the emulsifier 100. Section 143 first engages pressure relief line 145. Piping section 143 also communicates with pumps 147 and 148 which are provided in parallel for redundancy to deliver reagent from either vessel 115 or 120 to supply line 150 and on to the emulsifier 100.

A pair of surge tanks 160 and 170 are provided with the emulsifier 100. Surge tank 160 communicates with the emulsifier 100 (and supply line 150) by process piping section 162. Surge tank 170 communicates with the emulsifier 100 by process piping section 172. These surge tanks 160 and 170 are thus provided on either side of the emulsifier 100. A rupture disk 164 and 174 is provided in respective sections 162 and 172 that is intended to fail in the event of an unacceptable pressure build-up at the emulsifier 100.

Thus, it is to be understood that reagent composition may be a mixture of water, alcohol and caustic. The preferred mixture is pure water. The raw materials for that composition are contained in tanks 105, 107 and 109. The composition is introduced to the reagent vessels 115 and 120 by operation of either pump 112 or 114 or both. The composition of the mixture is monitored at sampling station 140 and the reagent composition is delivered to the emulsifier 100 by operation of either pump 147 or 148.

At the emulsifier 100, a steady flow of nitrogen gas is provided to the insertion point 99 by lines 35, 187 and 188 as they communicate with the nitrogen tanks 30–33. The insertion point 99 designates that position at which the flow of pentaborane in piping section 102 is introduced to the reagent composition in line 150. The insertion point 99 may be found at an ejector, at a needle valve opening or at the emulsifier 100. As shown, the insertion point 99 is just upstream of the emulsifier 100. It is to be understood that this steady flow of nitrogen maintains an opening at the ejector needle insertion point 99. Such a construction is known in the art. Those of ordinary skill in the art will appreciate that liquid flow through the emulsifier 100 is maintained by positive pressure from the centrifugal pump 147 or 148. As the pentaborane enters the injection point 99, it encounters a rapidly moving stream of hydrolysis reagent from piping 150. The pentaborane and reagent violently mix inside the emulsifier 100. The mixture is then delivered into a length of tubing 200 referred to as the "tortuous path." Hydrogen gas evolves inside the tubing 200 from the pentaborane diassociation. Gas evolution leads to a buildup of pressure inside the tubing 200. Moreover, the chemical reaction between the pentaborane and the reagent is exothermic, which causes the tubing 200 to heat. Such heat is removed by a recirculating closed-loop cooler 210. The cooler directs cool water to a jacket 212 surrounding the tortuous path tubing 200, which flows in a direction counter to that of the process fluid within the tortuous path 200. Heated water is cooled by an electrically powered fan 215 blowing air over cooling cools represented at 216. Heat rejection of the method and apparatus is estimated at approximately 100,000 Btu's/hour. If desired, static mixers 217 may be incorporated into tubing 200 in order to insure continued mixing of the reagent and the pentaborane. Further, temperature sensors 218 may be provided to permit an operator to remotely monitor the temperature during this reaction in the tortuous path 200.

Evolved gases and process fluid exit the tortuous path 200 under pressure in process piping section 220 for delivery to a reagent tank 115 or 120. The gases and fluids are delivered to either reagent vessel 115 or 120 by means of piping section 127 and valves 128 or 129. It is to be understood that each reagent vessel may be provided with a mechanical mixer. As shown in the drawing, vessel 115 and 120 are fitted with top-loaded mechanical mixers 225 and 230 that promote continued agitation of the reagent tanks. Of course, any suitable device for promoting such agitation is acceptable. Specifically, hydrogen gas is vented from tank 115 through exit line 233. Further, hydrogen gas is vented from tank 120 through line 235. Both lines 233 and 235 communicate with a section of piping 238. In the event that any moisture is present in the hydrogen gas, a vapor trap 240 is provided in line 238 to capture any such moisture and return it to tank 120 by means of a line 237.

A second sampling station 250 is provided in line 238. Gases vented past this point are subject to a gas composition measurement. Depending on the quantity of pentaborane present in the gas, the gas is directed either to a scrubber assembly 280 and a flare assembly for oxidation 290, or to a small, liquid phase reaction loop 300 similar to the primary process line described above. The scrubber assembly 280 preferably comprises a dry scrubber 282 in communication with a valve 284 by means of a process piping section 285.

In the event the gases tested at sampling station 250 are found to contain only small amounts of pentaborane, the valve 284 directs the gas to the scrubber 282 where residual pentaborane is removed therefrom. The scrubber is preferably a dry scrubber. However, an ammonia-based liquid scrubber (over a solid phase reaction media) may be utilized. The purified hydrogen gases are then delivered to a flame assembly 290 which is supported by a supply of propane maintained in a tank 292 that fuels a flame 294. The hydrogen gas is delivered from the scrubber 282 through a supply line 295 to the flame 294 for oxidation. After passing through the scrubber, hydrogen and possibly nitrogen should be the only gases proceeding to the flare where such gases are thermally oxidized into water vapor.

In the event that the gases sampled at sampling station 250 do contain significant amounts of pentaborane, the valve 284 directs such gases into process piping 302, by which such gases are delivered to an ejector 305. By operation of a pump 310, a reagent which may contain alcohol and water is delivered from a small reagent tank 315 to the ejector 305. The ejector 305 mixes and hydrolizes the mixture of said reagent and the mixture is delivered to a second, smaller tortuous path tubing 320 in which the reaction of any residual pentaborane with the reagent occurs to produce hydrogen gas. The gas and process fluid is delivered from the tubing 320 to a process piping section 323 to the smaller reagent vessel 315. In the vessel, the hydrogen gas bubbles to the top and is vented through line 325, where it is redirected to the scrubber 282, and burned as described above. Any residual boron in vessel 315 is treated and disposed of in a conventional manner.

As hydrolysis occurs during interaction of the reagents with the pentaborane, water and alcohol are consumed. These fundamental raw materials are replaced and otherwise maintained in accordance with conventional methods. These constituents essentially leave the system in the form of hydrogen, oxygen and hydroxyl (OH) groups or recombine in various configurations. As these components are consumed, the reagent composition changes and thus interacts with incoming pentaborane differently than with the original reagent mixture. Reactions may therefore proceed more slowly or may accelerate, depending upon the specific interactions which are favored thermodynamically. Because the constantly changing reagent combination leads to unpredictable behavior when reacting with incoming pentaborane, it is desirable to maintain the reagent components within a known, specific range. Using information obtained from the analytical and sampling station 140, reagent composition is monitored continuously. Once out of limit concentrations are observed, deficiencies are noted and specific chemicals (water, alcohol or sodium hydroxyde) are added from tanks 105, 107 or 109 as needed to bring the solution in the reagent vessels 115 and 120 back to within acceptable ranges.

In the event that the reagent composition is maintained in the primary on-line reagent vessel 115, reagent feed is diverted from the primary on-line vessel 115 to the secondary vessel containing fresh reagent 120. Once reagent from the secondary tank 120 is circulated through the system, the primary tank may be drained to a waste water treatment subsystem. Following treatment, recycled raw reagent is routed back to the reagent feed vessels (115 or 120) where it is brought into specification by the addition of necessary reagent elements.

After the majority of pentaborane in cylinder 20 has been forcibly removed by the introduction of nitrogen from one of the tanks 30–33 thereto, the cylinder 20 is turned upside down so that any remaining pentaborane is drained therefrom and processed in accordance with the foregoing description. Once the cylinder 20 has been inverted to remove such residual liquid pentaborane, it is again placed in an upright position for rinsing.

Rinsing is accomplished using a kerosene and alcohol mix in a separate water mix. A kerosene and alcohol mixture is slowly introduced into the now-empty cylinder 20 through its liquid phase valve. The alcohol portion of the mixture is contained in tank 70. The kerosene portion of the mixture is contained in tank 80. Utilizing pumps 82 and 72, the mix is fed slowly into the cylinder 20, interspersed with resting intervals to allow undissolved reactive solids to fully react and enter solution. When approximately twenty-five gallons of rinse mixture has been placed into the cylinder 20, it is again allowed to rest for a period of approximately six (6) hours. After this waiting period, the kerosene and alcohol mix solution is removed from the target cylinder 20 by the application of nitrogen under pressure to the vapor phase valve opening 23. In this manner, spent mixture solution is removed from the target cylinder 20 by application of nitrogen from the tanks 30–33 under pressure to the vapor phase valve opening 23 of the cylinder 20 so as to force such spent mix out of the liquid phase valve opening 23. When the cylinder 20 liquid level drops below the dip tube end, the cylinder 20 is once again inverted and residual rinse mixture is removed out the vapor phase valve opening 23. Spent rinse mixture is routed to its holding tank where it remains until used for another cylinder rinse cycle.

The kerosene and alcohol rinse is followed by a water rinse after the cylinder has once again been placed in an upright position. The water rinse cycle follows the same pattern as the earlier kerosene and alcohol rinse except that a minimum of five hundred gallons (500 gal.) of water is flushed through the cylinder 20 before the process is considered complete.

Water remaining inside the target cylinder 20 is removed using the same procedure as for the kerosene and alcohol mix. Flushed rinse water and residual rinse water are captured in a holding tank for subsequent treatment or reuse on the next cylinder. Whether such water is to be considered available for subsequent treatment is determined by analytical testing.

Thus, in practice of the present invention, a target cylinder 20 is placed into an airtight chamber and connected to process piping 25 and 40. Any air in the apparatus is removed and replaced with nitrogen expended from the tanks 30–33. Actuated valves are opened to allow the pentaborane in the cylinder 20 to flow from the cylinder into the process piping. Nitrogen from tanks 30–33 is forced into the cylinder through the dip tube 25 to the metering pump 51 or 52 as shown in FIG. 1. The metering pumps 51 and 52, which may also comprise metering valves, feed pentaborane into the vacuum feed line 102 at approximately ten pounds per hour. Reagent is pumped into the system from vessel 115 by means of pump 147 or 148 and contacts the pentaborane at the injection point 99. This mixture travels to the emulsifier 100. The pentaborane and reagent liquor passes through the emulsifier 100 where they are violently mixed together so as to start the hydrolysis. The mixture is then delivered to the tortuous path 200, where the exothermic reaction continues. The hydrolysis reaction now occurs wherein the elemental hydrogen is split from the boron. Heat given off during the hydrolysis is removed by a liquid cool jacket surrounding the piping.

The process liquor leaves the tortuous path 200, which may be enhanced by static mixers, and enters the primary reagent vessel 115. The reagent therein is continuously circulated by means of a pump 147 or 148. Moreover, the contents of the reagent vessel 115 (and the secondary reagent vessel 120) are continuously stirred by the vertical mixers 230 and 225. Hydrogen gas and residual boron in solution and any residual pentaborane are delivered to the reagent vessel 115 through line 220. Hydrogen gas and any residual vapors are vented from vessel 115 through line 233 to the vapor trap 240. Subsequent thereto, the vapors are analyzed for chemical constituents. In the event that no pentaborane is detected, the hydrogen gas and any residual vapor are vented to a dry scrubber 282 and flare 294. In the event that pentaborane is noted, the hydrogen gas and vapors may be directed to the alcoholysis subsytem 300 whereby any such residual pentaborane is broken down into its fundamental elements of hydrogen and boron. The hydrogen gas is vented back to the scrubber 282 and flare 294 through line 325. The hydrogen is oxidized at the flare 294, thus producing water vapor. The residual boron may remain in the reagent vessel 115 or 120 as boric acid, in which event its presence is simply monitored and accounted for through the introduction of additional reagent constituent elements, water and alcohol. If desired, the boron may also be precipitated out in a known manner through the use of inorganic hydroxides.

The present invention further contemplates a waste water treatment system whereby the boric acid may be processed and disposed. Such systems are known in the art and need not be disclosed in greater detail herein. Once the cylinder 20 is empty, it may be mechanically inverted (without hands-on worker participation) and any residual pentaborane liquid is removed through the vapor phase valve opening 23. Final clean-out of the cylinder 20 is accomplished using the organic solvent or a water-based reagent mixture that simultaneously dissolves and reacts with any residual solids that may be found inside the cylinder. The final clean-out system is thus a separate circuit from the primary pentaborane treatment processing system and will not contaminate the aqueous reagent stream. The entire process can be monitored and accomplished remotely. The sampling stations 140 and 250 are preferably fitted with necessary and known pH sensors and ORP sensors are provided to give operators the necessary information to respond to operate the apparatus within safe parameters.

While this invention has been described in detail with particular reference to preferred embodiments thereof, it will be understood that variations and modifications can be effected within the spirit and scope of the invention as described hereinabove and as described in the appended claims.

What is claimed is:

1. A process for treating pentaborane comprising the steps of:

extracting a quantity of pentaborane into a system devoid of air;

violently mixing in an emulsifier said pentaborane with a reagent so as to induce a hydrolytic reaction that separates a quantity of elemental hydrogen in gaseous form from said quantity of pentaborane;

thermally oxidizing said gaseous elemental hydrogen; and disposing of any residual material from said quantity of pentaborane resulting from said hydrolytic reaction.

2. The process of claim 1 further comprising the step of removing and replacing any air in said system with nitrogen.

3. The process of claim 2 further comprising the step of scrubbing said gaseous elemental hydrogen prior to oxidation.

4. The process of claim 1 wherein the step of violently mixing in an emulsifier said pentaborane with said reagent comprises the steps of:

pumping a portion of said pentaborane into said emulsifier; and in said emulsifier, introducing said pentaborane to a rapidly moving stream of said reagent to form a mixture comprising reagent and pentaborane.

5. The process of claim 1, wherein said reagent comprises water.

6. The process of claim 1, further comprising the step of passing said mixture of reagent and pentaborane through a tortuous path to isolate said elemental hydrogen from said pentaborane and produce residual boron.

7. A process for neutralizing pentaborane comprising the steps of:

pumping a quantity of pentaborane into an emulsifier;

in said emulsifier, violently mixing said pentaborane with a quantity of water so as to induce a hydrolytic reaction that separates a quantity of elemental hydrogen in gaseous form from said pentaborane; and passing said mixture comprising water and pentaborane through a tortuous path to isolate said elemental hydrogen from said pentaborane and produce a quantity of residual boron.

8. The process of claim 7, further comprising the step of thermally oxidizing said elemental hydrogen with a flare.

9. The process of claim 8, further comprising the step of scrubbing said elemental hydrogen in a dry scrubber prior to thermal oxidation.

10. The process of claim 7, further comprising the step of precipitating out said residual boron through the use of inorganic hydroxides.

11. The process of claim 10, further comprising the step of removing and replacing any air in said emulsifier with nitrogen.

* * * * *